US007471945B2

(12) United States Patent
Gabara et al.

(10) Patent No.: US 7,471,945 B2
(45) Date of Patent: Dec. 30, 2008

(54) METHODS AND APPARATUS FOR PREVENTING A THIRD PARTY FROM OVERHEARING A TELEPHONE CONVERSATION

(75) Inventors: Thaddeus Gabara, New Providence, NJ (US); Vladimir Prodanov, New Providence, NJ (US)

(73) Assignee: Agere Systems Inc., Allentown, PA (US)

( * ) Notice: Subject to any disclaimer, the term of this patent is extended or adjusted under 35 U.S.C. 154(b) by 952 days.

(21) Appl. No.: 10/999,904

(22) Filed: Nov. 30, 2004

(65) Prior Publication Data

US 2006/0115080 A1 Jun. 1, 2006

(51) Int. Cl.
*H04M 1/66* (2006.01)
*H04M 1/68* (2006.01)
*H04M 3/16* (2006.01)

(52) U.S. Cl. ............................. 455/411; 379/7; 379/35

(58) Field of Classification Search ..................... 379/7, 379/35, 406.01, 406.03, 406.06, 406.15, 379/406.16, 388.05; 455/410, 411
See application file for complete search history.

(56) References Cited

U.S. PATENT DOCUMENTS

2006/0045063 A1* 3/2006 Stanford et al. ............. 370/345
2006/0262935 A1* 11/2006 Goose et al. .................. 381/17

* cited by examiner

*Primary Examiner*—Binh K Tieu
(74) *Attorney, Agent, or Firm*—Ryan, Mason & Lewis, LLP

(57) ABSTRACT

Methods and apparatus are provided for preventing a third party from listening to a conversation between at least two participants on a telephone. The telephone generates an audio stimulus signal that is presented through a secondary speaker. The audio stimulus signal may be, for example, pseudorandom noise or a cancellation signal. According to one aspect of the invention, the telephone ensures that the audio stimulus signal does not significantly impair the conversation for the at least two participants. To prevent the third party from listening to the local portion of the conversation, the audio stimulus signal is subtracted from the received signal prior to presenting the received signal to the user. To prevent the third party from listening to the remote portion of the conversation, the audio stimulus signal is subtracted from the received signal.

20 Claims, 4 Drawing Sheets

110
120
230
130
210
220
215

300
355
350
DUPLEX
360
RF DOWN CONVERTER
365
RECEIVE BASEBAND
370
CODEC
380
330
RF UP CONVERTER
325
TRANSMIT BASEBAND
322
+
-
320
CODEC
315
210
220
215
345
CODEC
340
NOISE GENERATOR (VOICE CANCELLER)

600
DUPLEX
650
655
RF DOWN CONVERTER
660
RF UP CONVERTER
630
RECEIVE BASEBAND
665
PSEUDORANDOM NOISE
640
TRANSMIT BASEBAND
625
CODEC
670
CODEC
645
CODEC
620
+
-
510
520
615
$D_{earpiece}$
515
525

METHODS AND APPARATUS FOR PREVENTING A THIRD PARTY FROM OVERHEARING A TELEPHONE CONVERSATION

FIELD OF THE INVENTION

The present invention is related to techniques for ensuring private telephone conversations, and more particularly, to methods and apparatus for preventing a third party from overhearing a telephone conversation.

BACKGROUND OF THE INVENTION

In today's mobile society, people increasingly have private telephone conversations in public settings. Even in many office environments, a number of people do not have a private office and their telephone conversations are subject to being overheard. A need therefore exists for methods and apparatus for preventing a third party from overhearing a telephone conversation.

SUMMARY OF THE INVENTION

Generally, methods and apparatus are provided for preventing a third party from listening to a conversation between at least two participants on a telephone. The telephone generates an audio stimulus signal that is presented through a secondary speaker. The audio stimulus signal may be, for example, pseudorandom noise or a cancellation signal. According to one aspect of the invention, the telephone ensures that the audio stimulus signal does not significantly impair the conversation for the at least two participants.

To prevent the third party from listening to the local portion of the conversation, the audio stimulus signal is subtracted from the received signal prior to presenting the received signal to the user to isolate the voice signal of the remote participant. To prevent the third party from listening to the remote portion of the conversation, the audio stimulus signal is subtracted from the received signal to isolate the voice signal of the remote participant. In this manner, the subtraction cancels the feedback of the audio stimulus signal that would otherwise be received by the user of the telephone.

A more complete understanding of the present invention, as well as further features and advantages of the present invention, will be obtained by reference to the following detailed description and drawings.

DETAILED DESCRIPTION

Figure 1:
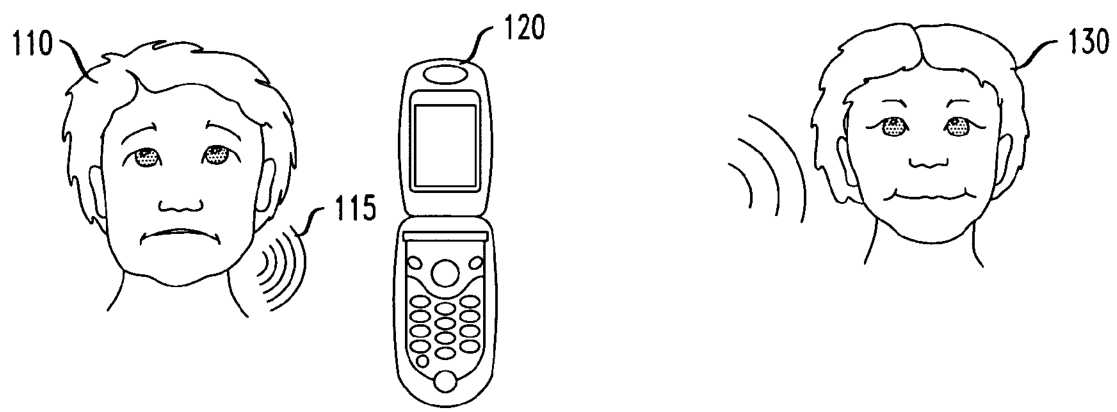
FIG. 1 illustrates an eavesdropper attempting to listen in on a local portion of a telephone conversation.

FIG. 1 illustrates an eavesdropper 130 attempting to listen in on a telephone call conducted by an owner 110 of a telephone 120. In particular, in the embodiment of FIG. 1, the eavesdropper 130 is attempting to listen to the owner's side 115 of the telephone conversation (i.e., to the words spoken by the telephone owner 110). The eavesdropper 130 is physically in the vicinity of the telephone owner 110. The telephone 120 may be embodied, for example, as a cellular telephone, a cordless telephone, or a standard wired telephone. It is thus noted that while the present invention is illustrated in the context of a cellular telephone, the present invention can be applied to any telephone type, as would be apparent to a person of ordinary skill.

Figure 2:
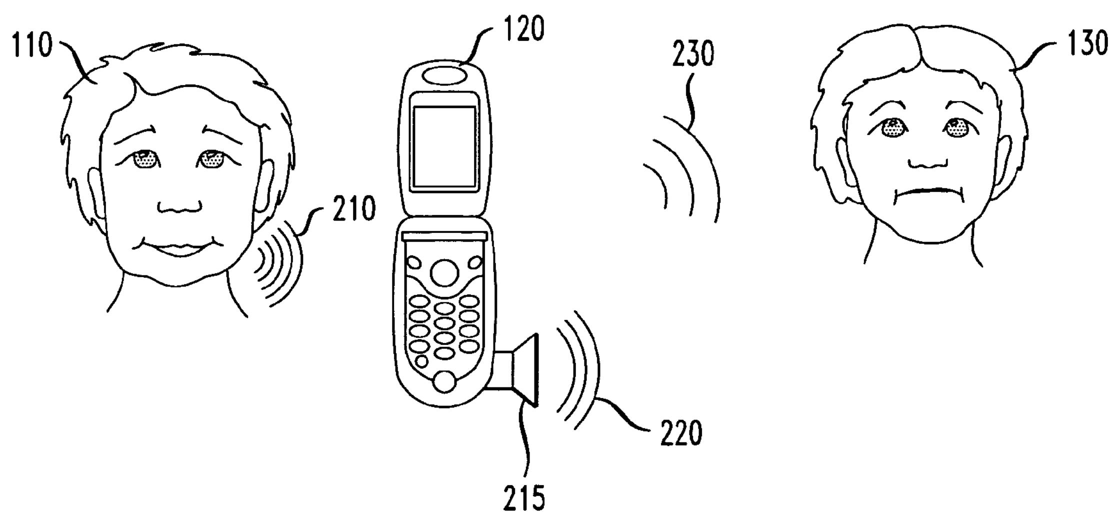
FIG. 2 illustrates a technique for preventing the eavesdropper of FIG. 1 from overhearing the local portion of the telephone conversation in accordance with the present invention.

According to one aspect of the invention, shown in FIG. 2, the eavesdropper 130 is prevented from overhearing the telephone conversation, by introducing a secondary speaker 215 to the telephone 120. The secondary speaker 215 allows a stimulus 220, such as pseudorandom noise or a cancellation signal, to be generated. As shown in FIG. 2, the voice signal 210 of the telephone owner 110 is received by a mouthpiece (i.e., a microphone) of the telephone 120. In addition, the stimulus 220 is generated by the secondary speaker 215. The cancellation signal is generally an audio signal that is of equal yet opposite magnitude to the voice signal 210 of the telephone owner 110, so that the net effect experienced by the eavesdropper 130 is no signal at all.

In this manner, the eavesdropper 130 will hear the combination 230 of the generated stimulus 220 and the voice signal 210 of the telephone owner 110. In the case of a pseudorandom noise, the eavesdropper 130 will not be able to distinguish the voice signal 210 of the telephone owner 110 from the noise 220. In the case of a cancellation signal, the cancellation signal 220 will cancel the voice signal 210 of the telephone owner 110 from the noise 220 and the eavesdropper 130 should not hear anything.

Figure 3:
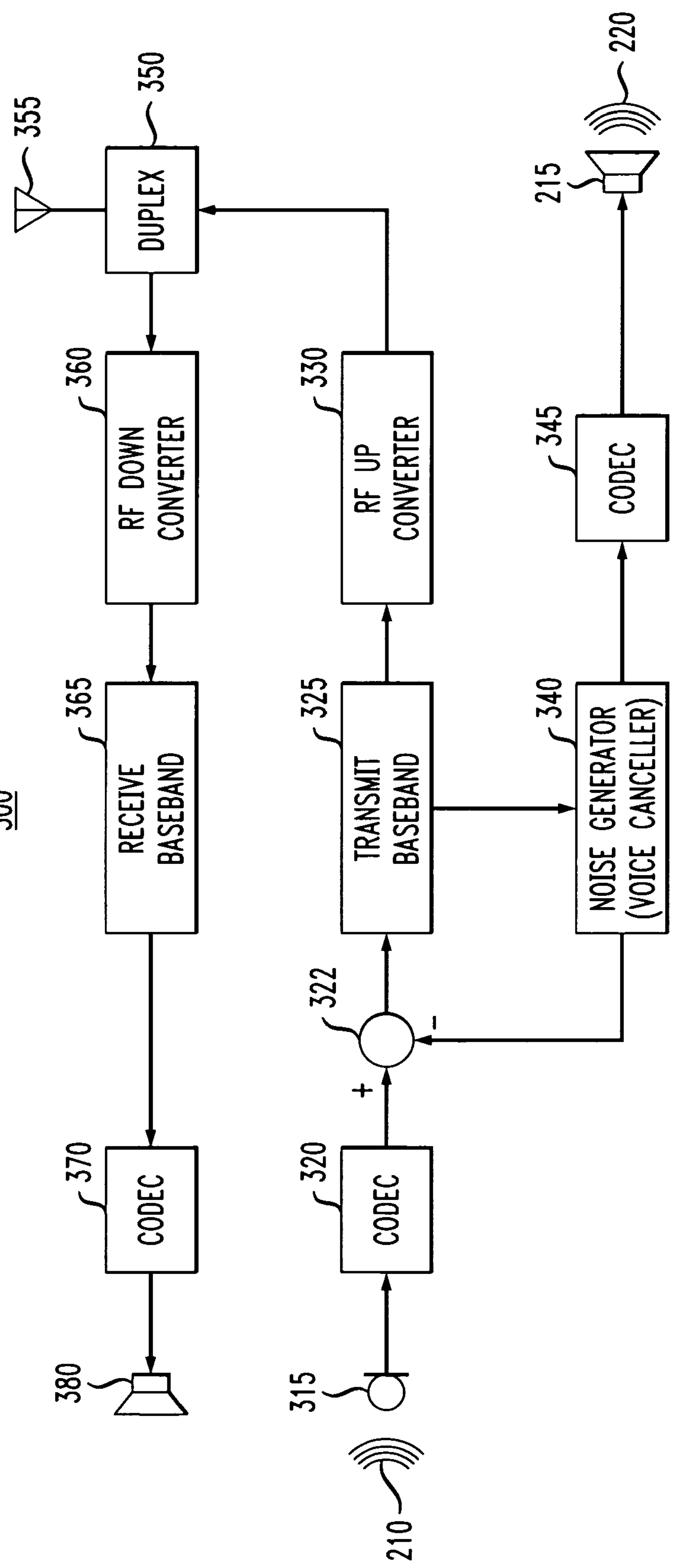
FIG. 3 is a schematic block diagram of a telephone incorporating features of the present invention to prevent an eavesdropper from listening to the owner's side of the telephone conversation.

As discussed hereinafter, the telephone 120 knows the generated stimulus 220, and can therefore subtract the stimulus 220 from the voice signal 210 of the telephone owner 110, to thereby isolate the voice signal 210 of the telephone owner 110 for transmission to the remote party (not shown) of the telephone conversation. FIG. 3 is a schematic block diagram of a telephone 300 incorporating features of the present invention to prevent an eavesdropper 130 from listening to the owner's side 115 of the telephone conversation.

As shown in FIG. 3, a mouthpiece 315 (i.e., a microphone) of the telephone 300 receives a signal 310 that comprises the voice signal 210 of the telephone owner 110 and the stimulus 220 generated by the secondary speaker 215. A codec 320 encodes the signal 310, in a known manner, and applies the encoded signal to a first input of a subtractor 322. In addition, in accordance with the invention, a pseudorandom noise generator 340 (or a voice canceller) generates the stimulus 220. The stimulus 220 is encoded by a codec 345 and presented by the secondary speaker 215. In addition, the pseudorandom noise generator 340 applies the stimulus 220 to a second input of the subtractor 322. In this manner, the known generated stimulus 220 can be subtracted from the voice signal 210 of the telephone owner 110, to thereby isolate the voice signal 210 of the telephone owner 110 for transmission to the remote party (not shown) of the telephone conversation.

Thus, the voice signal 210 of the telephone owner 110 is processed by a transmit baseband stage 325, an RF upconverter 330 and a duplex 350, in a known manner beyond the scope of the present invention, for transmission on an antenna 355. The receive branch of the telephone 300 comprises an RF down converter 360, receive baseband stage 365, codec 370 and an earpiece 380, in a conventional manner.

Figure 4:
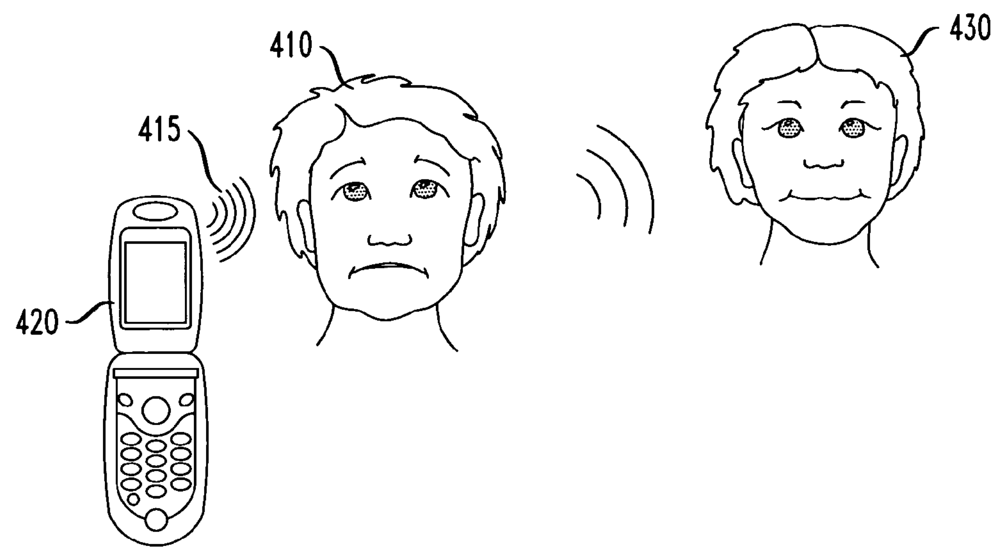
FIG. 4 illustrates an eavesdropper attempting to listen in on a remote portion of a telephone conversation.

FIG. 4 illustrates an eavesdropper 430 attempting to listen in on a telephone call conducted by an owner 410 of a telephone 420. In particular, in the embodiment of FIG. 4, the eavesdropper 430 is attempting to listen to the remote side 415 of the telephone conversation (i.e., to the words spoken by the remote party of the telephone conversation (not shown), as played through the earpiece or speaker of the telephone 420). The telephone 420 may be embodied, for example, as a cellular telephone, a cordless telephone, a speaker telephone or a standard wired telephone.

Figure 5:
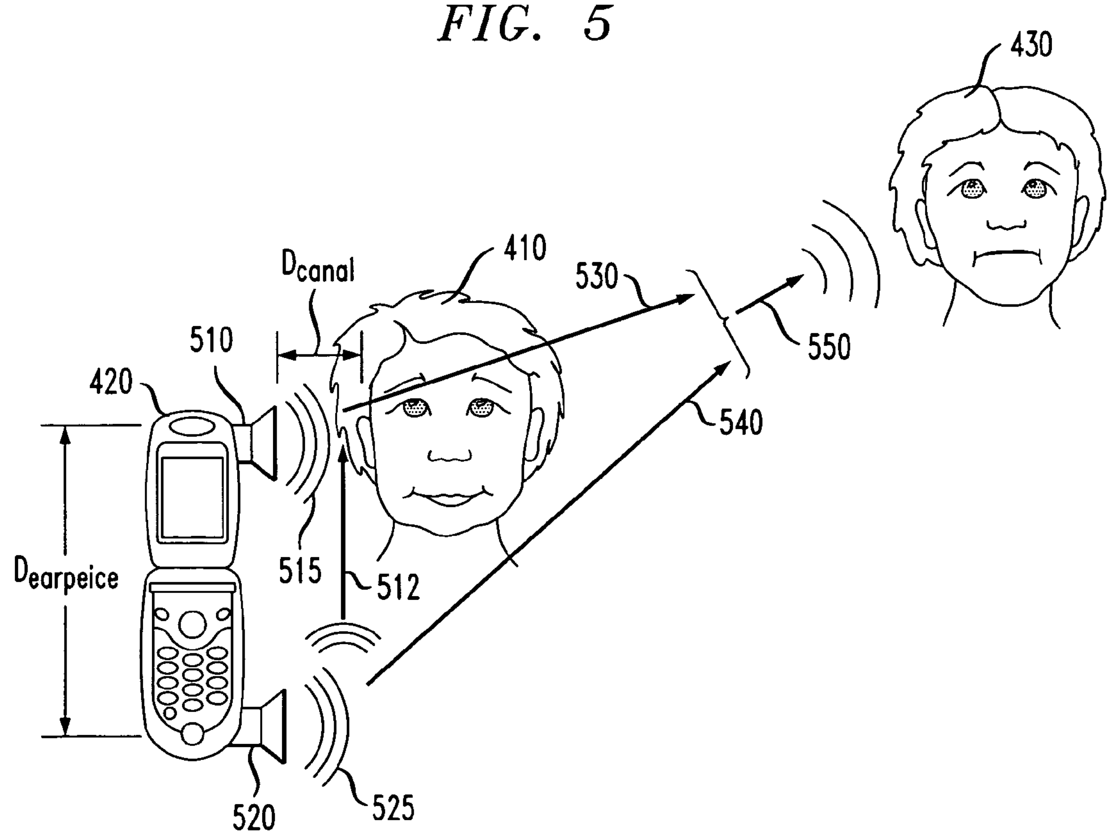
FIG. 5 illustrates a technique for preventing the eavesdropper of FIG. 4 from overhearing the remote portion of the telephone conversation in accordance with the present invention.

According to another aspect of the invention, shown in FIG. 5, the eavesdropper 430 is prevented from overhearing the remote portion of the telephone conversation, by introducing a secondary speaker 520 to the telephone 420. The secondary speaker 520 allows a stimulus 525, such as pseudorandom, to be generated. The distance, $D_{earpiece}$, between the primary speaker 510 and the secondary speaker 520, should be significantly greater than the distance, $D_{canal}$, between the ear of the owner 410 and the primary speaker 510.

As discussed further below in conjunction with FIG. 6, the primary speaker 510 generates the correct signal 515 at the ear canal of the owner 410, since the pseudorandom noise 525 generated by the secondary speaker 520 is subtracted inside the telephone 400. The eavesdropper 430 receives a signal 550 over two paths 530, 540 from the two speakers 510, 520, respectively. The signal 550 is a random signal since it is a summation of sound from both speakers 510, 520. The random signal 550 will mask the correct signal 515, as long as the distance from the eavesdropper 430 to the speakers 510, 520 does not equal the difference ($D_{earpiece}$–$D_{canal}$) or a multiple thereof. Generally, the energy from both speakers 510, 520 is randomized as the distance from the telephone 400 increases greater than the phone-ear canal distance. In this manner, the eavesdropper 430 will hear the combination 550 of the generated stimulus 525 and the voice signal 515 of the remote telephone participant (not shown) (generally sensed as noise or no signal).

The distance, $D_{earpiece}$, between the primary speaker 510 and the secondary speaker 520 is known, and the distance, $D_{canal}$, between the ear of the owner 410 and the primary speaker 510. In one implementation, the relative movement between the telephone 400 and the ear canal of the owner 410 can be sensed and the signal adjusted accordingly. In a further variation, the owner 400 can optionally adjust the quality of signal using test signals.

Figure 6:
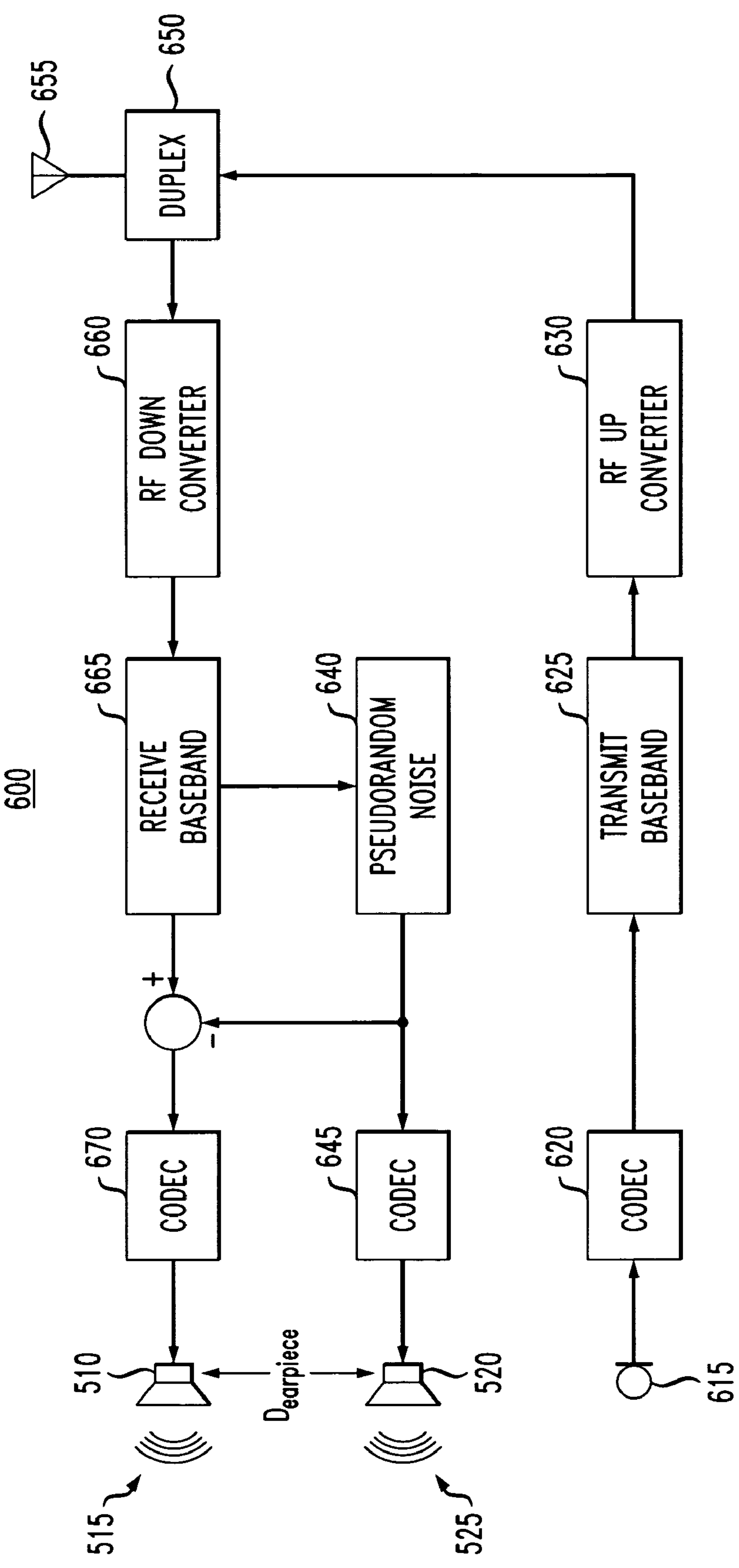
FIG. 6 is a schematic block diagram of a telephone incorporating features of the present invention to prevent an eavesdropper from listening to the remote portion of the telephone conversation.

FIG. 6 is a schematic block diagram of a telephone 600 incorporating features of the present invention to prevent an eavesdropper 130 from listening to the remote portion of the telephone conversation. As shown in FIG. 6, a mouthpiece 615 (i.e., a microphone) of the telephone 600 receives a signal 310 that comprises the voice signal of the telephone owner 410 and the stimulus generated by the speakers 510. 520. A codec 620 encodes the signal, in a known manner, and applies the encoded signal to a transmit baseband stage 625, an RF upconverter 630 and a duplex 650, in a known manner beyond the scope of the present invention, for transmission on an antenna 655.

The receive branch of the telephone 600 comprises an RF down converter 660, receive baseband stage 665, codec 670 and an earpiece 510. The RF down converter 660, receive baseband stage 665 operate in a conventional manner. The output of the receive baseband stage 665 is applied to a first input of a subtractor 667.

In addition, in accordance with the invention, a pseudorandom noise generator 640 (or a voice canceller) generates the stimulus 525. The stimulus 525 is encoded by a codec 645 and presented by the secondary speaker 520. As shown most clearly in FIG. 5, the owner 410 of a telephone 420 will hear the stimulus 525 from the secondary speaker 520 via a path 512. Thus, as shown in FIG. 6, the pseudorandom noise generator 640 applies the stimulus 525 to another input of the subtractor 667. In this manner, the known generated stimulus 525 can be subtracted from the receiver voice signal of the remote participant, to thereby isolate the received voice signal 515 of the remote participant for presentation to the owner 410.

It is to be understood that the embodiments and variations shown and described herein are merely illustrative of the principles of this invention and that various modifications may be implemented by those skilled in the art without departing from the scope and spirit of the invention.

We claim:

1. A method for preventing a third party from listening to a conversation between at least two participants on a telephone, comprising the steps of:

generating an audio stimulus signal;

ensuring said audio stimulus signal does not significantly impair said conversation for said at least two participants; and presenting said audio stimulus signal through a secondary speaker on said telephone.

2. The method of claim 1, wherein said audio stimulus signal is pseudorandom noise.

3. The method of claim 1, wherein said audio stimulus signal is a cancellation signal.

4. The method of claim 1, wherein said third party is attempting to listen to a local portion of said conversation.

5. The method of claim 4, wherein said ensuring step further comprises the step of subtracting said audio stimulus signal from a signal captured by a microphone of said telephone.

6. The method of claim 1, wherein said third party is attempting to listen to a remote portion of said conversation.

7. The method of claim 6, wherein said ensuring step further comprises the step of subtracting said audio stimulus signal from a signal received by said telephone.

8. The method of claim 7, wherein said subtracting step cancels feedback of said audio stimulus signal received by a user of said telephone.

9. A telephone that prevents a third party from listening to a conversation between a user of said telephone and a remote participant, comprising:

a microphone for capturing an audio signal;

a signal generator for generating an audio stimulus signal;

a subtractor for subtracting said audio stimulus signal from said audio signal to isolate a voice signal of a user of said telephone for transmission to said remote participant; and a secondary speaker for presenting said audio stimulus signal.

10. The telephone of claim 9, further comprising a primary speaker for presenting a voice signal of said remote participant to said user of said telephone.

11. The telephone of claim 9, wherein said audio stimulus signal is pseudorandom noise.

12. The telephone of claim 9, wherein said audio stimulus signal is a cancellation signal.

13. The telephone of claim 12, wherein said cancellation signal prevents said third party from hearing said audio signal.

14. The telephone of claim 9, wherein said third party is attempting to listen to said voice signal.

15. A telephone that prevents a third party from listening to a conversation between a user of said telephone and a remote participant, comprising:

an input for receiving a received signal from said remote participant;

a signal generator for generating an audio stimulus signal;

a subtractor for subtracting said audio stimulus signal from said received signal to isolate a voice signal of said remote participant;

a primary speaker for presenting said voice signal of said remote participant to said user of said telephone; and a secondary speaker for presenting said audio stimulus signal.

16. The telephone of claim 15, further comprising a microphone for capturing an audio signal.

17. The telephone of claim 15, wherein said audio stimulus signal is pseudorandom noise.

18. The telephone of claim 15, wherein said audio stimulus signal is a cancellation signal.

19. The telephone of claim 15, wherein said third party is attempting to listen to said voice signal.

20. The telephone of claim 15, wherein said subtractor cancels feedback of said audio stimulus signal received by said user of said telephone.

* * * * *